(12) United States Patent  
Hooker

(10) Patent No.: US 6,770,324 B2  
(45) Date of Patent: Aug. 3, 2004

(54) METHOD OF FORMING A NON-UNIFORM, PROTECTIVE COATING ON A FLEXIBLE SUBSTRATE

(75) Inventor: Michael A. Hooker, Sheboygan, WI (US)

(73) Assignee: Kennedy Acquisition, Inc., Kentwood, MI (US)

( * ) Notice: Subject to any disclaimer, the term of this patent is extended or adjusted under 35 U.S.C. 154(b) by 264 days.

(21) Appl. No.: 09/828,308

(22) Filed: Apr. 6, 2001

(65) Prior Publication Data

US 2002/0146543 A1 Oct. 10, 2002

(51) Int. Cl.⁷ .......................... B05D 3/12; B29C 59/00
(52) U.S. Cl. ...................... 427/355; 427/256; 264/129
(58) Field of Search .................. 264/1.1, 1.31, 264/1.32, 2.7, 129, 130, 132, 134, 546, 103, 35, 238; 223/52, 57; 427/256, 282, 372.2, 384, 510, 511, 521, 522, 558, 595, 258, 261, 267, 270, 271, 274, 275, 280, 2.24, 162, 164, 373, 377, 378; 351/160 R, 162, 177

(56) References Cited

U.S. PATENT DOCUMENTS

| 4,253,908 A | 3/1981 | Stephen-Daly | 216/32 |
| 4,478,977 A | 10/1984 | Sperry et al. | 525/61 |
| 4,533,397 A | * | 8/1985 | Wingler et al. | 514/162 |

(List continued on next page.)

FOREIGN PATENT DOCUMENTS

| EP | 0012542 | 11/1979 |
| EP | 0028903 | 10/1980 |
| EP | 0860300 | 1/1998 |

OTHER PUBLICATIONS

Definition of "mold" from Merriam–Webster Dictionary at www.m–w.com.*
Website pages—Screen Web "In–Mold Decorating"; www.screenweb.com/industrial/cont/inmold.html; Dec. 2, 2000; pp. 1–5.
Website pages—Screen Web "How IMD Works"; www.screenweb.com/industrial/cont/inmold2.htm; Dec. 2, 2000; pp. 1–5.
Website pages "Classical Dot and Stochastic Halftone"; www.gspinc.com/support/fastfacts/3008.htm; Nov. 30, 2000; pp. 1–2.
Website pages "Stochastic Screening"; www.ee3.com/hi-fi.html; Nov. 30, 2000; pp. 1–2.

(List continued on next page.)

Primary Examiner—Bret Chen
Assistant Examiner—William Phillip Fletcher, III
(74) Attorney, Agent, or Firm—Price, Heneveld, Cooper, DeWitt & Litton, LLP

(57) ABSTRACT

In the present invention, a protective coating is preferably formed as a plurality of dots upon a surface to be protected. The dots have a selected size, cover a selected amount of the underlying surface, and are preferably isolated from one another by uncoated surfaces. This coating not only provides the coated substrate or object (and the cured coating itself) with significantly increased flexibility and formability, but also with a wide range of possible surface finishes and textures. Due to the increased coating flexibility and formability, the coated substrate or object can be partially or even fully cured prior to forming operations such as injection molding or film shaping. The substrate or object is therefore less susceptible to damage from handling and from machine operations. One highly preferred coating embodiment is produced with ink having a controllable stipple amount for a significantly increased range of possible coating finishes and textures.

46 Claims, 2 Drawing Sheets

U.S. PATENT DOCUMENTS

| | | | | |
|---|---|---|---|---|
| 4,611,039 A | * | 9/1986 | Powell et al. | 526/271 |
| 4,636,438 A | | 1/1987 | Hudson et al. | 428/412 |
| 4,704,017 A | * | 11/1987 | Knapp | 351/177 |
| 4,921,740 A | | 5/1990 | Falconer et al. | 428/41.6 |
| 4,929,469 A | | 5/1990 | Kimura et al. | 427/511 |
| 4,997,687 A | | 3/1991 | Carter | 428/34 |
| 5,034,166 A | * | 7/1991 | Rawlings et al. | 264/1.7 |
| 5,043,362 A | | 8/1991 | Balfour et al. | 522/14 |
| 5,085,697 A | | 2/1992 | Kimura et al. | 522/40 |
| 5,098,633 A | | 3/1992 | Hausler | 264/511 |
| 5,244,470 A | * | 9/1993 | Onda et al. | 8/507 |
| 5,524,531 A | * | 6/1996 | Merry | 100/35 |
| 5,554,684 A | | 9/1996 | Choi et al. | 524/588 |
| 5,689,426 A | | 11/1997 | Kemeny et al. | |
| 5,824,395 A | | 10/1998 | Zemel | 428/195 |
| 5,919,834 A | | 7/1999 | Downs et al. | 522/33 |
| 5,948,707 A | * | 9/1999 | Crawley et al. | 442/101 |
| 6,032,576 A | | 3/2000 | Collins | 101/127 |
| 6,125,749 A | | 10/2000 | Jones | 101/129 |

OTHER PUBLICATIONS

Web Site pages "Printing Industry"; http://nuclear.hazard.uiuc.edu/packets/printing/screen.htm; Nov. 30, 2000; pp. 1–25.

Web Site pages "Special Report on Seybold San Francisco, Fall 93"; http://167.216.203/seybold report/reports/S0202010.HTM; Nov. 30, 2000; pp. 1–13.

Web Site pages—Art 2u "Screenprinting Today"; www.art2u.com/news/screenprinting.html ; Oct. 28, 2000; pp. 1–3.

Web Site pages—Screen Web "The technology of IMD"; www.screenweb.com/industrial/cont/inmold3.htm; Dec. 2, 2000; pp. 1–4.

Web Site pages—Cryptographics "Silkscreen Posters" www.cryptographics.com/technica.htm; Oct. 28, 2000; pp. 1–3.

Product Brochure, "Film Systems for in–mold decoration", Autotype; pp. 1–3.

Product Support Pack, "Film Systems for in–mold decorations", Autotype Mar. 23, 2000; pp. 1–68.

Technical Manual, "Autotype Film systems for in–mold decoration (IMD)", Autotype, First Edition 2000; pp. 1–124.

* cited by examiner

METHOD OF FORMING A NON-UNIFORM, PROTECTIVE COATING ON A FLEXIBLE SUBSTRATE

FIELD OF THE INVENTION

The present invention relates to coatings, and more particularly to protective coatings and methods of forming such coatings.

BACKGROUND OF THE INVENTION

A large number of coatings exist for protecting surfaces on a wide variety of industrial and commercial products, many of which present challenges to a satisfactory coated end product. A problem that is common to many applications arises as a result of the flexure or deformation of a coated surface. A protective coating on a surface that is flexible or is subjected to deformation is generally more likely to fail, whether by losing adherence, peeling, cracking, or otherwise exposing some or all of the underlying surface, by wrinkling or buckling, by developing coating areas that are stressed or weakened, and the like. A number of these problems can occur in the relatively new technology of in-mold decoration (IMD). Generally speaking, IMD is the application of text, a pattern, or graphics to a molded part as part of the molding process.

A popular type of IMD process employs the use of insert molding in which a formable film is layered with a protective coating on one side (referred to as the "first" side or surface), and is printed with text, a pattern, or graphics on an opposite side (referred to as the "second" side or surface). With reference to FIG. 1, which illustrates a conventional IMD process in flowchart form, the film is first printed or "decorated" with the text, pattern, or graphics in a conventional manner, such as by silk-screening or other types of printing. The film can be decorated on both first and second surfaces, but is commonly decorated on only the surface that is not exposed to wear and the environment (the second surface in many cases). The fact that the text, pattern, or graphics is printed on the opposite (second) side of the film also protects the text, pattern, or graphics from such potentially damaging exposure. Because the film is typically light-transmissive, second-surface decorations will be visible through the film after the product is completed. The first surface is exposed to wear and the environment, and so may need protection from scratches, abrasion, fluids, and the like. Therefore, the first surface is coated with the protective coating. The hardcoat is left uncured so that it can be formed with the film later in the process.

With continued reference to FIG. 1, after the decorations and protective coating have been applied to the surfaces of the film as just described, the film is formed into a desired shape in one of several conventional manners. For example, the film can be vacuum thermoformed, pressure formed, hydroformed, matched metal formed, etc. Considerations in the type of forming operation selected include the amount of film shaping to be performed (referred to as the amount of "draw" needed for the desired final shape, such as a deep draw or shallow draw), and the extent to which the forming operation will damage or affect the protective coating. It is this latter consideration that presents significant problems in conventional IMD processes. Specifically, conventional protective coatings typically need to be cured to achieve their strong and wear-resistant properties. However, once cured, these same properties largely limit the ability of these protective coatings to be stretched, bent, compressed, or otherwise formed without damage. While this is not normally a problem with protective coatings upon a final product, it is a significant problem in the film forming operation described above. Therefore, protective coatings are typically left uncured in conventional IMD processes until after the film forming process.

Although the uncured protective coating can be easily shaped without sustaining damage, it is relatively delicate and susceptible to scratching, marring, impressions, and the like. By way of example only, such damage can occur as the film is being taken out of the printing and coating machinery, when the film is stacked upon other films for transport or otherwise, during movement and handling of the film from the printing and coating machinery to the molding machinery, when the film is inserted into the molding machinery, during the molding operation, when the film is removed from the molding machinery, and during movement and handling of the film from the molding machinery to a location where the protective coating is cured.

In order to protect the uncured protective coatings from damage, special procedures are commonly used, such as restrictions on the amount of film stacking, protection of the film from exposure to light and heat (many protective coatings are cured by exposure to ultraviolet light and/or heat), procedures for particular care in handling the films, and the like. In addition, the ability of many forming operations and machinery to damage the uncured protective coating limits the types of operations and machinery that can be used. The special handling procedures and the inability to employ many types of machinery and processing operations just described represent significant limitations of conventional protective coatings and affects the entire IMD process. These limitations inevitably increase the inefficiency and cost of production of the IMD process and therefore of the end product.

Even with special handling procedures and the use of specific machinery to avoid protective coating damage, the delicate uncured protective coatings inevitably increase the scrap rate of films and the products made with such films. In some cases, even a small number of scrapped films can significantly impact production costs.

Yet another limitation of conventional protective coatings is related to their resulting appearance and performance, and is independent of whether the surface provided with the protective coating is later molded or otherwise shaped. In this regard, it should be noted that conventional protective coatings are commonly applied to a number of different surfaces that are not later molded or otherwise shaped. Although a number of conventional protective coatings are strong and wear resistant, the ability of a manufacturer to control the appearance of the final coated product can often be quite limited. Protective coatings that can be opaque or transparent and that can have a range of glossy, matte, and textured finishes are highly desirable, but are normally not available in one conventional protective coating.

In light of the problems and limitations of the prior art described above, a need exists for a protective coating that can be employed in IMD processes, is strong and wear-resistant, can be cured prior to forming operations of the underlying substrate, is sufficiently flexible and formable after curing to withstand such forming operations without damage, enables the use of a wider variety of molding machinery to form the underlying substrate, reduces the chances of coating damage during substrate printing, handling, transport, and molding processes, reduces scrap rates and production costs, can be transparent or can be partially or fully opaque, and can have a range of finishes (from glossy to matte and a range of textures). Each preferred embodiment of the present invention achieves one or more of these results.

SUMMARY OF THE INVENTION

In some preferred embodiments of the present invention, a protective coating is preferably formed as a plurality of dots on a substrate or object which is desired to be protected. As described in greater detail below, the dots can be any shape, can have the same or different shapes, and can be in any density and in any pattern (or no pattern) on the substrate or object. Preferably, the dots are isolated or substantially isolated from one another by uncoated surfaces of the substrate or object, thereby not only providing the substrate or object and the coating with significantly increased cured flexibility and formability, but also with a wide range of possible surface finishes and textures.

Due to the increased flexibility and formability of some embodiments of the protective coating even after being cured, the coated substrate or object can be partially or even fully cured prior to forming operations such as injection molding or film shaping. The substrate or object is therefore less susceptible to damage from handling and from machine operations. This reduces the scrap rate of the substrates or objects being produced and therefore lowers production costs and the cost of the end product. In addition, because the protective coating can be partially or fully cured before forming operations, more types of machines and methods (that could otherwise damage uncured protective coatings) can be employed for forming, shaping, and other manufacturing operations upon the substrate or object being produced.

Although the dots of the protective coating can be applied to a surface in any desired arrangement or pattern, the dots are more preferably applied in an arrangement that is known to present a uniform and pleasing appearance to the protective coating. Most preferably, this arrangement is stochastically generated and is repeatedly reproduced over the surface to be protected. The dots can be any average size, but preferably are an average of between 50 and 150 microns, more preferably are an average of between 80 and 100 microns, and most preferably are approximately 90 microns. The dots can also cover any amount of the surface area to be protected, but preferably cover between 20% and 70% of the surface area, more preferably cover between 20% and 40% of the surface area, and most preferably cover approximately 25% of the surface area.

The protective coating material and the resulting protective coating can be any color desired, but is preferably transparent or substantially transparent. In this manner, the surface beneath the protective coating can be printed or otherwise provided with text or graphics and can have any desired color visible through the protective coating. The protective coating is preferably a second surface protective coating, and can be applied over text or graphics on the first or second surfaces of a film or other object.

Preferably, the protective coating material is an ink that is screen printed upon the surface to be protected. However, other conventional printing and application methods can instead be employed if desired. After being applied to the surface, the protective coating material is preferably cured by exposure to ultraviolet light, although other curing methods are possible (including exposure to air and to heat) depending upon the type of protective coating material used. Once cured, the dots defining the protective coating enable the surface and the protective coating to be flexed and formed without damage, or at least without sufficient protective coating damage to compromise product quality. At the same time, the dots are sufficiently close together to protect the underlying surface from fluids, abrasion, stains, and other damage.

In some highly preferred embodiments, the protective coating can be pre-cured to control the end appearance of the protective coating. In the case of ultraviolet-cured protective coating materials, the protective coating can be initially exposed to relatively low-wattage ultraviolet light. This exposure preferably generates stipple upon the surfaces of the dots defining the protective coating, and can be further enabled by the use of gas flow (e.g., a nitrogen knife) over the dots during exposure to the low-wattage ultraviolet light. Thereafter, the protective coating material can be exposed to higher wattage ultraviolet light to complete the curing process. The amount of stipple can be controlled by (among other factors) controlling the intensity of the low-wattage ultraviolet light, the length of protective coating exposure thereto, and the amount of gas flow over the protective coating.

A surface coated with the protective coating of the present invention can be provided with a much wider variety of final appearances and textures than is possible with conventional protective coatings and coating methods. In particular, the number and pattern (if any) of dots, the average dot size, the amount of surface area covered by the dots, and the type of protective coating material used can all be altered to generate a range of protective coating appearances and textures. An even larger range of appearances and textures are possible by generating and controlling the degree of stipple upon the surfaces of dots as described above.

Further objects and advantages of the present invention, together with the organization and manner of operation thereof, will become apparent from the following detailed description of the invention when taken in conjunction with the accompanying drawings, wherein like elements have like numerals throughout the drawings.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE PREFERRED EMBODIMENTS

A large number of significant advantages are provided by the protective coating of the present invention when employed in an IMD process in which a film is formed into a desired shape after being printed. The film is preferably plastic, and more preferably is a conventional polycarbonate plastic or polyester-polycarbonate plastic alloy. However, one having ordinary skill in the art will recognize that the present invention can be employed in conjunction with a number of other conventional films, each one of which falls within the spirit and scope of the present invention. By way of example only, such other films include without limitation polyester, acrylic, and styrene films. The films can be any thickness desired, subject to the manner in which molding is performed upon each type of film. In particular, the molding equipment and process used to mold a film normally perform satisfactorily up to a maximum thickness for that film. The maximum thickness of each film is dependent upon factors such as film stiffness, response to temperature, and the like.

Although well-suited for protecting films such as those described above, some embodiments of the present invention are independent of substrate thickness. The protective coating of the present invention can be applied to many different types of substrates, whether in film form or not, whether later molded or otherwise shaped, and whether placed through later manufacturing processes or not (e.g., used as an insert for later injection molding, adhered or otherwise attached to another part, and the like). In short, the present invention can be used in conjunction with parts having any shape or size, and is described herein with reference to plastic films only by way of preferred example. Accordingly, the term "substrate" as used herein and in the appended claims includes any coatable part having any shape and size.

Figure 1:
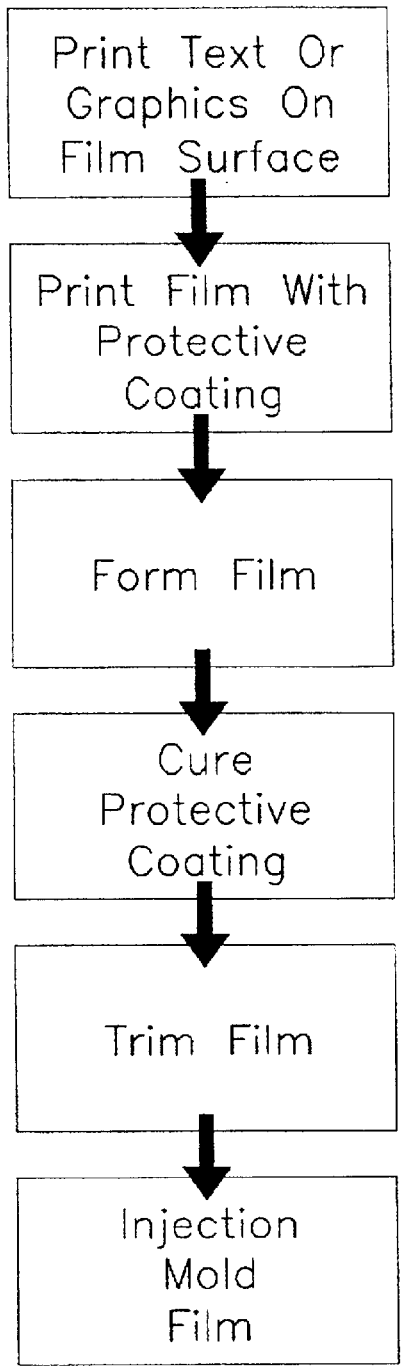
FIG. 1 is a flowchart of a typical IMD process according to the prior art.
Figure 2:
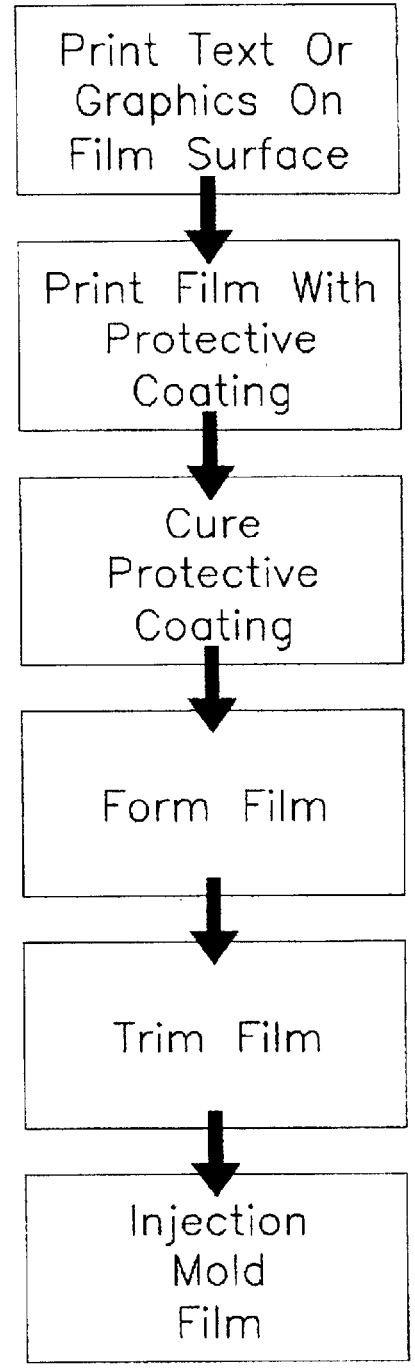
FIG. 2 is a flowchart of an IMD process according to a preferred embodiment of the present invention.

An IMD molding process according to a preferred embodiment of the present invention is illustrated in flowchart form in FIG. 2. First, the second surface of the film is preferably decorated with graphics, a pattern, and/or text as described above. In other embodiments, the first surface can also or instead be decorated if desired. The surface(s) are preferably screen printed in a conventional manner, although any other manner of decoration can be employed. If necessary, the decoration process can involve multiple printing steps, such as printing one or more colors or portions of the final decoration in steps.

Next, the protective coating of the present invention is applied to the film. The protective coating can be applied to the second surface over the decorations thereon, but more preferably is applied to the first surface. In other embodiments, the protective coating is applied to both first and second surfaces of the film.

The protective coating in the most preferred embodiment is applied in fluid form to the first surface, and can be applied thereto in any conventional manner. The protective coating can be printed upon the first surface, and in some highly preferred embodiments is screen printed thereon. In other highly preferred embodiments, the protective coating is pad printed upon the first surface. Screen and pad printing can be performed in a number of manners well known to those skilled in the art and are not therefore described further herein. Still other conventional manners of printing are possible and can be employed to apply the protective coating to the first surface, each one of which falls within the spirit and scope of the present invention.

Next, the protective coating is preferably cured on the film. Depending upon the type of protective coating material used, the protective coating can be cured in a number of different manners. Most preferably, the protective coating is cured by exposure of the coating material to ultraviolet light, although other highly preferred embodiments employ protective coatings that are cured by exposure to heat. The protective coating material can be exposed to ultraviolet light emitters (e.g., in the form of light bulbs, fiber optic lenses, and the like) in any conventional manner. As will be described in more detail below, the protective coating is printed in a manner such that the cured protective coating is preferably capable of flexing and forming with the film without damage to the protective coating. This is very different from conventional cured protective coatings that tend to crack, peel, detach (from the substrate) and chip when the substrate is flexed or otherwise formed due to the loss of coating material flexibility once cured. This is less of a concern in those applications where the coated surface is not later exposed to flexure or forming. However, the improved control over coating and finished product appearance provided by the present invention also provides important advantages over conventional protective coatings as described in more detail below.

If desired, the film can be further decorated after the protective coating process, such as by the application of graphics, a pattern, and/or text upon the protective coating material or upon an uncoated surface. After the protective coating curing process, the printed and coated film is preferably placed in a molding machine. The molding machine can be of any conventional type capable of forming the film into a desired shape. By way of example only, the molding machine can be a thermoforming, pressure-forming, hydroforming, or matched metal machine (with rubber or other elastomeric forming inserts if desired). In some applications, it is even possible to form the film using an injection molding machine in which the film is placed in the injection molding machine and is formed in an injection molding operation with hot resin in the molding cavity. One having ordinary skill in the art will appreciate that still other types of molding machines can be employed to form the film. Because the protective coating upon the film has already been cured, the protective coating can withstand greater pressures during the molding process and in some preferred embodiments can be exposed to significant contact without being blemished, scratched, or otherwise damaged. As described in greater detail below, the cured protective coating is also capable of deeper draw molding operations without being damaged.

With continued reference to FIG. 2, the molded film is then removed from the molding machine and is cut and trimmed as desired using any conventional cutting and trimming techniques and equipment. Among other purposes, this cutting and trimming operation can be performed to properly fit the molded film into an injection molding machine.

Finally, in those cases where later injection molding is desired (if not performed with the film forming operation as described above), the molded film is preferably inserted within an injection molding machine for injection molding upon at least the second surface of the film. Preferably, the resulting injection molded part has an exterior surface with a cured protective coating and has text, a pattern, and/or graphics located behind the coated film and therefore not exposed to contact, wear, and the environment.

A number of different protective coating materials can be used with the present invention. Some conventional protective coating materials that can be used are cured by being subjected to heat, air, chemicals (e.g., in gaseous form acting as a catalyst), and light. More preferably however, the protective coating material is an ink that is cured by exposure to ultraviolet light. Examples of such inks include nitrogen cured and non-nitrogen cured inks. Although either type of ultraviolet cured ink (and still other inks) can be employed in the present invention, a nitrogen cured ultraviolet ink is most preferred. Protective coating materials and inks and their properties are well known to those skilled in the art and are not therefore described further herein.

The protective coating of the present invention is capable of being formed after being cured, thereby providing significant advantages over conventional protective coatings that must remain uncured until film forming operations are complete. This coating flexibility is due at least in part to the form of the protective coating upon the film (or other substrate desired to be provided with a protective coating). Specifically, the protective coating is preferably defined by a number of substantially isolated dots as opposed to an unbroken layer of material.

Figure 3:
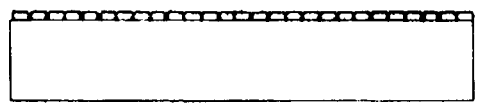
FIG. 3 is a cross-sectional perspective view of a printed substrate having a protective coating according to a preferred embodiment of the present invention.
Figure 4:
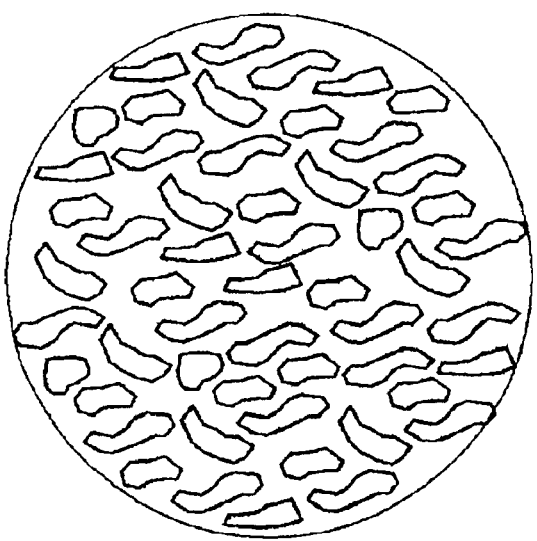
FIG. 4 is a plan detail view of the coating shown in FIG. 3.

With reference to FIGS. 3 and 4, each dot takes the form of an island surrounded by substantially uncoated portions of the substrate. Each dot can take any shape desired, including without limitation square, rectangular, triangular, and other polygonal shapes, round, oval, elliptical, crescent, and other curved shapes, star, football, egg, polymorphous, and other unusual shapes, and the like. In some highly preferred embodiments such as that shown in FIGS. 3 and 4, the dots have irregular shapes.

The dots defining the protective coating can all be identical or substantially identical, but more preferably are different to some degree. This can be accomplished with the selection of two or more different types of dot shapes in any desired ratio. In some embodiments, each dot has a random shape that is unique or is preferably only similar to the shape of other dots by coincidence. Most preferably, a number of different dot shapes (irregular as shown in FIG. 4 and/or regular) are employed and are scattered with respect to one another and are preferably sized and arranged to be substantially invisible (from a short distance) to the naked eye.

In some highly preferred embodiments, the dots all cover comparable amounts of surface areas upon the substrate, even though the dot shapes may vary. Other embodiments can employ dots covering different amounts of substrate surface area, in which any frequency of each dot size can be selected as desired. The protective coating of the present invention can be applied over any portion or portions or all of a substrate or object, such as over an entire side of a substrate, in only those areas that are visible to a user of the end product, in areas that are intended to have a desired appearance in contrast to adjacent or other areas of the substrate or object, in a pattern of areas over the substrate or object, in areas that are subject to greater contact and wear, and the like.

The dots of the protective coating can be any size desired. However, superior results have been achieved with dot sizes between 50 and 150 microns (the average diameter or length of the dots). More preferably, the average dot size is between 80 and 100 microns. Most preferably, the average dot size is approximately 90 microns. Although other printing resolutions are possible and can be used in the present invention, a 4,000 pixel per square inch (ppi) resolution is preferred.

As described above, the dots are preferably separated or substantially separated from one another by uncoated substrate areas. As a result, the protective coating can flex between the dots without imparting damaging stresses upon the dots themselves. The average distance between the dots is preferably a function of the dot size described above and the amount of surface area covered by the dots. Although virtually any amount of surface area greater than 0% and less than 100% can be covered by the dots, preferred results have been achieved when the dots cover between 20% and 70% of the surface area. More preferably, the dots cover between 20% and 40% of the surface area. Most preferably, the dots cover approximately 25% of the surface area.

In addition to the protective coating flexibility and formability of the present invention, the hardcoat material dots protect against scratching, scuffing, and other abrasion, marring, and the like. Also, because the dots are located sufficiently close together, they limit the ability of fluid, objects, and other debris to get between the dots and to reach the underlying substrate. The substrate is therefore protected against blemishing and staining (e.g., from oils, foods and drinks, cleaning solutions, and the like).

It will be clear to one having ordinary skill in the art that the dots do not necessarily have to be completely isolated from contact with one another to arrive at the present invention. The dots should be separated enough to permit flexibility of the protective coating with the underlying substrate by relative motion of the dots rather than by imparting excessive stresses from one dot to another. Accordingly, in some embodiments the dots can contact one another and can even have bridges of hardcoat material connecting one another while still having flexibility provided by spaces between the dots. In these and other embodiments, a relatively thin layer of hardcoat material can cover the spaces between the dots while permitting relative motion of the much thicker dots without impermissible damage thereto. In this regard, it should be noted that high and even damaging stresses can be acceptable in a finished coated product. Specifically, these stresses can create an acceptable amount of damage to the dots and protective coating. Such damage includes damage that is invisible to the naked eye and that will not magnify to macroscopic protective coating damage over time and environmental exposure, and damage that will not lead to peeling or visible cracking (eventually compromising the integrity of the protective coating).

Substantially isolated dots as just described still perform the substrate-protective functions described above. More preferably however, the dots of the protective coating are each entirely separated from one another by substrate having no hardcoat material thereon.

Another feature of the protective coating according to the present invention (in addition to the substrate protecting and flexibility features) relates to the appearance of the coated substrate. The relative placement of the dots upon the substrate can significantly impact the protective coating's appearance. Therefore, in some preferred embodiments, the dots defining the protective coating are placed in locations and in an arrangement upon the substrate to result in a desired finish and appearance of the cured protective coating. The dots can be located and arranged in any manner, including without limitation in an array or grid, completely randomly, in any predetermined pattern, and the like. In addition, the dots can be arranged in any orientation. While this applies to dots having specific shapes (e.g., rectangular or otherwise elongated dots all oriented in a particular direction and/or oriented in a desired manner with respect to one another, the sides of square dots being parallel to one another, etc.), this applies to irregularly-shaped dots as well (e.g., dots having a length greater than a width being oriented in a particular direction and/or oriented in a desired manner with respect to one another, etc.).

A smooth and uniform appearance is desirable in many protective coatings. Therefore, because a completely random deposit of dots often presents less than a smooth and uniform appearance as is well-known to those skilled in printing and related arts, a predetermined pattern or arrangement of dots is used in some highly preferred embodiments of the present invention. With reference for example to FIG. 4, an arrangement of dots is preferably employed that is known to present a uniform appearance to the protective coating. This arrangement is comprised of a pattern of dots oriented and positioned in a desired manner, and can be reproduced again and again over the surface of the substrate. Although any material deposition or printing process can be used to coat the substrate with the pattern, the dots are most preferably printed by a conventional screen printing process. The pattern can be a fraction of a millimeter in size or can be larger if desired. The pattern can be designed, but is preferably randomly generated in any conventional manner. Most preferably, the pattern is generated by stochastic printing methods, and is repeatedly reproduced as just described over the surface of the substrate.

In some preferred embodiments of the present invention, the dots are preferably the same or substantially the same height as best shown in FIG. 3 and can have any side profile shape desired. In other embodiments, the dots have different heights.

As mentioned earlier, the protective coating material is preferably a nitrogen ultraviolet cured or non-nitrogen ultraviolet cured ink, and is more preferably a nitrogen ultraviolet cured ink. A non-nitrogen ultraviolet cured ink is preferably cured by exposure to conventional ultraviolet bulbs or other ultraviolet light emitters. For example, the coated film or object can be exposed to relatively high-wattage multiple banks of mercury vapor and/or gallium ultraviolet bulbs. These banks of bulbs can have varying intensities for different curing results. Any number of banks can be used, and each bank can have any number of ultraviolet bulbs. By way of example only, the coated film or object can be exposed to a single ultraviolet bulb until cured, or can be exposed to three banks of four high wattage mercury vapor bulbs followed by three banks of four higher wattage gallium bulbs. If multiple banks of bulbs are used, the coating can be exposed to different types and wattages of ultraviolet bulbs in any desired order.

In some preferred embodiments of the present invention, the substrate or object coated with the uncured or partially cured protective coating is placed upon a conventional conveyor. The conveyor can retain the substrate or object upon the conveyor in any conventional manner, such as with an electrostatic charge or by a vacuum force as is well known to those skilled in the art. Other conveyors do not retain the substrate or object as it is moved. The conveyor preferably moves past the banks of ultraviolet bulbs at a desired speed or speeds to expose the coating material to ultraviolet light for desired lengths of time. It will be appreciated by one having ordinary skill in the art that other manners exist for exposing the coating material to one or more banks of ultraviolet bulbs for predetermined periods of time, each one of which falls within the spirit and scope of the present invention. For example, banks of bulbs can be conveyed or otherwise moved into exposing position adjacent to the coated substrate or object. As another example, the substrate or object can be moved to a bank of the same or various types and wattages of bulbs, any number of which can be turned on and off for predetermined periods of time during the curing process.

Some degree of control over the coated surface or object's appearance is possible by changing the type of protective coating material being used. For this purpose, many conventional coating materials are available for providing different surface appearances and textures. For example, inks having fine, medium, and coarse finishes are available and can be used to produce matte, satin, glossy, and other surface appearances, and to a lesser extent can be used to produce some surface textures. Therefore, the protective coating of the present invention can be made with dots of any desired protective coating material type to produce a range of dot surface appearances and textures, thereby providing a range of surface appearances and textures.

More preferably however, the surfaces of the dots are shaped in a pre-curing or "soft-curing" process in which a surface of the protective coating is first cured to produce stipple upon the protective coating surface. Although an amount of control of surface appearance and even texture is possible by using different coating materials in the present invention as described above, the inventor has found that much more control and better results are possible by employing a soft-curing process. In this process, as an outer layer of the protective coating material cures, it moves over the underlying uncured coating material. The outer layer therefore forms in an uneven manner (generates "stipple") over the remainder of the underlying uncured protective coating material. This is performed using lighter initial curing intensity (e.g., less powerful light in the case of ultraviolet cured inks). After the surface of the protective coating has been cured, the remainder of the protective coating is preferably cured with higher intensity. By controlling the amount of initial curing intensity and exposure time, the coating stipple can be increased or decreased, thereby generating a relatively large range of coating surface appearances and textures.

For example, some highly preferred embodiments employ a nitrogen ultraviolet curing process to generate stipple on the surface of the protective coating described above. Using a nitrogen ultraviolet cured ink, the surface or object coated with the dots of uncured protective coating is exposed to relatively low-wattage ultraviolet bulbs (for example, germicidal ultraviolet bulbs). To enhance this part of the curing process, a flow of gas can be directed over the surface being exposed to the low-wattage ultraviolet bulbs. A flow of nitrogen gas (sometimes called a "nitrogen knife") has been found to be very effective for this purpose, although other types of gas can be used as desired. The gas flow is preferably used to help cure the surface of the protective coating material by removing oxygen therefrom. As mentioned above, the amount of exposure to the low-wattage bulbs and the intensity of the low-wattage bulbs can be selected from respective exposure and wattage ranges to generate a desired stipple on the protective coating. In this regard, the amount of gas flow over the coating material can also be increased or decreased to change the degree of curing, the stipple, and therefore the resulting coating appearance and texture.

After the soft-curing process has been completed to generate a desired coating surface stipple as just described, the coated surface or object is preferably exposed to higher intensity ultraviolet light to complete the curing process as described in greater detail above. Preferably, the low-wattage curing and the following high-wattage curing is performed by conveying the coated surface or object past banks of ultraviolet bulbs as also described above, in which case the flow of gas (e.g., the nitrogen knife) is preferably located adjacent to the bank or banks of low-wattage bulbs.

The appearance of the protective coat can be controlled by the size and shape of the dots defining the protective coat, the spacing between the dots, the protective coating material used, the amount (if any) of stipple on the surface of the dots, and the finish of the underlying substrate. The size, shape, and stipple of the dots and the spacing between the dots can affect the manner in which light reflects from the protective coating, thereby imparting a more glossy or matte appearance or a texture to the protective coating. Also, the protective coating material can be transparent or can be opaque, and can be colored using any conventional technique or coating material additive.

In many applications, it is possible (and highly desirable) to first print or otherwise coat the film or other object with a finish. This finish can give the coated object an appearance ranging from glossy to matte and can even provide the coated object with a texture. Although the finish can be applied upon the second film surface, it is more preferably applied upon the first surface of the film or other object. The finish is preferably screen printed, but can be deposited in any other conventional manner desired. Such finish application and techniques for applying finishes are well known to those skilled in the art and are not therefore described further herein. After the finish is applied, the above-described protective coating can be applied thereover. The finish is preferably visible at least between the dots defining the protective coating, and more preferably is visible through a transparent protective coating as well as between the dots. In either case, the term "substrate" includes the film or object being coated as well as the finish applied thereto (and any other layers of material applied to the film or object before the protective coat).

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, the present invention is described above in the context of an in-mold decoration (IMD) process. It should be noted, however, that the protective coating of the present invention can be employed to coat any object regardless of whether the object is later molded or otherwise formed and regardless of the manner in which such molding or forming is performed (subject only to the ability of the protective coating to withstand the molding or forming process selected without damage). In this regard, the substrate coated with the protective coating need not be a plastic film, and can be any object capable of being coated. Therefore, some parts that are provided with a protective coating according to the present invention may not have a "second surface" as described above with reference to the illustrated IMD process. In such cases, the protective coating is only provided on the first surface over any earlier-applied text or graphics.

In the preferred embodiments of the present invention described above and illustrated in the figures, the substrate (and protective coating) is shaped after the protective coating is fully cured, whether in a single curing process or with an additional pre-curing process as described in greater detail above. In other embodiments, the protective coating need not necessarily be cured or fully cured prior to molding or forming operations. The protective coating can be cured at any stage in making the product, although significant benefits exist to at least partially curing the protective coating prior to molding or forming operations. In some embodiments, the protective coating material can be partially cured to resist damage from handling and shaping (while remaining highly flexibility and formability for shaping), and can then be fully cured to achieve the cured protective coating properties described above. For example, the coated substrate or object can be formed after the pre-curing process used for stipple generation described above. As another example, the coated substrate or object can be fully or partially formed after being partially cured with high-wattage ultraviolet bulbs as also described above.

We claim:

1. A method of forming a protective coating upon a polymer substrate that softens when heated, the method comprising:
    printing upon the substrate a plurality of dots with spaces of exposed substrate therebetween;
    curing the plurality of dots to harden the plurality of dots into a protective coating, wherein spaces between the dots permit flexibility of the substrate without damage to the plurality of dots;
    after curing the plurality of dots, heating the substrate to a temperature at which the substrate softens sufficiently to permit forming thereof; and
    forming the substrate in a molding machine after curing the plurality of dots.

2. The method as claimed in claim 1, wherein printing upon the substrate includes screen printing the plurality of dots upon the substrate.

3. The method as claimed in claim 1, wherein the plurality of dots are in a stochastically-generated arrangement.

4. The method as claimed in claim 1, wherein printing upon the substrate includes printing a repeating dot arrangement.

5. The method as claimed in claim 1, wherein curing the plurality of dots includes exposing the plurality of dots to ultraviolet light.

6. The method as claimed in claim 1, wherein curing the plurality of dots includes heating the plurality of dots with a heater.

7. The method as claimed in claim 1, wherein the protective coating is substantially transparent.

8. The method as claimed in claim 1, wherein the printing step is a second surface printing step.

9. The method as claimed in claim 1, further comprising printing at least one of text, a pattern, and graphics upon the substrate.

10. The method as claimed in claim 9, wherein printing at least one of text, a pattern, and graphics upon the substrate occurs prior to printing the plurality of dots upon the substrate.

11. The method as claimed in claim 10, wherein the plurality of dots and the at least one of text, a pattern, and graphics are printed on a same side of the substrate.

12. The method as claimed in claim 9, wherein the plurality of dots and the at least one of text, a pattern, and graphics are printed on opposite sides of the substrate.

13. The method as claimed in claim 1, wherein the dots have an average size of between 50 and 150 microns.

14. The method as claimed in claim 1, wherein the dots have an average size of between 80 and 100 microns.

15. The method as claimed in claim 1, wherein the dots have an average size of about 90 microns.

16. The method as claimed in claim 1, wherein printing the plurality of dots includes covering between 20% and 70% of the substrate.

17. The method as claimed in claim 1, wherein printing the plurality of dots includes covering between 20% and 40% of the printed substrate.

18. The method as claimed in claim 1, wherein printing the plurality of dots includes covering about 25% of the printed substrate.

19. A method of manufacturing a product having a protective coating, the method comprising:
  printing a plurality of dots upon a polymer substrate of the type that softens when heated, the plurality of dots having spaces therebetween;
  curing the plurality of dots into a hardened protective coating on the substrate;
  after curing the plurality of dots, heating the substrate to a temperature at which the substrate softens sufficiently to permit forming thereof;
  forming the substrate to a desired shape of the product in a molding machine after curing the plurality of dots; and
  flexing the hardened protective coating by the spaces between the dots while forming the substrate in a molding machine.

20. The method as claimed in claim 19, wherein printing the plurality of dots includes screen printing the plurality of dots.

21. The method as claimed in claim 19, wherein the dots are substantially separated from one another by spaces.

22. The method as claimed in claim 19, wherein printing the plurality of dots includes repeatedly printing a pattern of dots.

23. The method as claimed in claim 22, wherein the pattern of dots is a stochastically-generated pattern.

24. The method as claimed in claim 19, wherein the hardened protective coating is substantially transparent.

25. The method as claimed in claim 19, wherein the substrate is a sheet of plastic material.

26. The method as claimed in claim 19, further comprising printing at least one of text, a pattern, and graphics upon the substrate.

27. The method as claimed in claim 26, wherein printing at least one of text, a pattern, and graphics upon the substrate occurs prior to printing the plurality of dots upon the substrate.

28. The method as claimed in claim 27, wherein the plurality of dots and the at least one of text, a pattern, and graphics are printed on a same side of the substrate.

29. The method as claimed in claim 26, wherein the plurality of dots and the at least one of a text, a pattern, and graphics are printed on opposite sides of the substrate.

30. The method as claimed in claim 19, wherein curing the plurality of dots includes exposing the plurality of dots to ultraviolet light.

31. The method as claimed in claim 19, wherein curing the plurality of dots includes heating the plurality of dots with a heater.

32. The method as claimed in claim 19, wherein the step of forming the substrate is performed in a mold.

33. The method as claimed in claim 19, wherein the dots have an average size of between 50 and 150 microns.

34. The method as claimed in claim 19, wherein the dots have an average size of between 80 and 100 microns.

35. The method as claimed in claim 19, wherein the dots have an average size of about 90 microns.

36. The method as claimed in claim 19, wherein the plurality of dots includes covering between 20% and 70% of the substrate.

37. The method as claimed in claim 19, wherein printing the plurality of dots includes covering between 20% and 40% of the printed substrate.

38. The method as claimed in claim 19, wherein printing the plurality of dots includes covering about 25% of the printed substrate.

39. A method of forming a protective coating upon a substrate subject to abrasion, the method comprising:
  printing upon the substrate a plurality of dots with spaces of exposed substrate therebetween;
  curing the plurality of dots to harden the plurality of dots into a protective coating, wherein the spaces between the dots permit flexibility of the substrate without damage to the plurality of dots; and further comprising soft curing the plurality dots to generate stipple thereon.

40. The method as claimed in claim 39, wherein soft curing the plurality of dots includes exposing the plurality of dots to low-wattage ultraviolet light bulbs and a flow of gas over the plurality of dots.

41. A method of manufacturing a product having a protective coating, the method comprising:
  printing a plurality of dots upon a substrate, the plurality of dots having spaces therebetween;
  curing the plurality of dots into a hardened protective coating on the substrate;
  forming the substrate to a desired shape of the product;
  flexing the hardened protective coating by the spaces between the dots while forming the substrate; and further comprising:
    partially curing the plurality of dots prior to curing the plurality of dots; and
    forming stipple upon the plurality of dots while partially curing the plurality of dots.

42. The method as claimed in claim 41, wherein:
  partially curing the plurality of dots includes exposing the plurality of dots to a flow of nitrogen gas and to ultraviolet light; and
  curing the plurality of dots includes exposing the plurality of dots to ultraviolet light having a lower intensity than the ultraviolet light used to partially cure the plurality of dots.

43. A method of forming a protective coating upon a substrate to abrasion, the method comprising:
  printing upon the substrate a plurality of dots with spaces of exposed substrate therebetween;
  curing the plurality of dots to harden the plurality of dots into a protective coating, wherein the spaces between the dots permit flexibility of the substrate without damage to the plurality of dots; and
  forming the substrate in a molding machine after curing the plurality of dots; and wherein the substrate is a polyester-polycarbonate alloy.

44. A method of forming a protective coating upon a substrate to abrasion, the method comprising:
  printing upon the substrate a plurality of dots with spaces of exposed substrate therebetween;
  curing the plurality of dots to harden the plurality of dots into a protective coating, wherein the spaces between the dots permit flexibility of the substrate without damage to the plurality of dots; and
  forming the substrate in a molding machine after curing the plurality of dots; and wherein the substrate is a light-transmitting substrate.

45. A method of manufacturing a product having a protective coating, the method comprising:
  printing a plurality of dots upon a substrate, the plurality of dots having spaces therebetween;
  curing the plurality of dots into a hardened protective coating on the substrate; forming the substrate to a desired shape of the product in a molding machine after curing the plurality of dots; and flexing the hardened protective coating by the spaces between the dots while forming the substrate in a molding machine, wherein the substrate is a sheet of polyester-polycarbonate alloy.

46. A method of manufacturing a product having a protective coating, the method comprising:

printing a plurality of dots upon a light-transmissive substrate, the plurality of dots having spaces therebetween;

curing the plurality of dots into a hardened protective coating on the substrate;

forming the substrate to a desired shape of the product in a molding machine after curing the plurality of dots; and flexing the hardened protective coating by the spaces between the dots while forming the substrate in a molding machine.

* * * * *